(12) United States Patent
Martin

(10) Patent No.: US 10,144,075 B2
(45) Date of Patent: Dec. 4, 2018

(54) FLAT FILE

(71) Applicant: Georg Martin GMBH, Dietzenbach (DE)

(72) Inventor: Christoph Martin, Dietzenbach (DE)

(73) Assignee: Georg Martin GMBH (DE)

( * ) Notice: Subject to any disclaimer, the term of this patent is extended or adjusted under 35 U.S.C. 154(b) by 7 days.

(21) Appl. No.: 15/516,840

(22) PCT Filed: Oct. 13, 2015

(86) PCT No.: PCT/EP2015/073718
§ 371 (c)(1),
(2) Date: Apr. 4, 2017

(87) PCT Pub. No.: WO2016/062588
PCT Pub. Date: Apr. 28, 2016

(65) Prior Publication Data
US 2017/0304918 A1    Oct. 26, 2017

(30) Foreign Application Priority Data
Oct. 23, 2014 (DE) .................. 20 2014 008 439 U

(51) Int. Cl.
*B23D 71/04* (2006.01)
*B25F 1/00* (2006.01)
*B23D 79/08* (2006.01)

(52) U.S. Cl.
CPC ............. *B23D 79/08* (2013.01); *B23D 71/04* (2013.01); *B25F 1/00* (2013.01); *Y10T 156/1184* (2015.01); *Y10T 156/1983* (2015.01); *Y10T 156/1989* (2015.01); *Y10T 407/18* (2015.01); *Y10T 407/182* (2015.01); *Y10T 407/1825* (2015.01)

(58) Field of Classification Search
CPC ........ B23D 71/00; B23D 71/04; B23D 71/06; B23D 71/08; B23D 79/08; Y10T 407/18; Y10T 407/181; Y10T 407/182; Y10T 156/1184; Y10T 156/1983; Y10T 156/1989; B25F 1/00
See application file for complete search history.

(56) References Cited

U.S. PATENT DOCUMENTS 1,447,910 A * 3/1923 Thalheimer ............ B23D 71/00
                                                     407/29.1
1,631,882 A * 6/1927 Nordan ................. B23D 71/00
                                                     407/29.1
(Continued)

FOREIGN PATENT DOCUMENTS

CH    277412 A     8/1951
DE    37743 C    11/1885
(Continued)

OTHER PUBLICATIONS

Chelsea Miller Knives web page, http://www.chelseamillerknives.com/shop1/.*

(Continued)

*Primary Examiner* — Mark A Osele
(74) *Attorney, Agent, or Firm* — Seth L. Hudson; Clements Bernard Walker, PLLC

(57) ABSTRACT

The object of the invention is a flat file which is suitable for lifting off films from intermediate layers.

5 Claims, 1 Drawing Sheet

(56) References Cited

U.S. PATENT DOCUMENTS

| | | | | |
|---|---|---|---|---|
| 1,746,391 A * | 2/1930 | Gibbs | ............... | B23D 71/00 |
| | | | | 407/29.14 |
| 4,571,184 A * | 2/1986 | Edwardson | ............ | A61C 3/06 |
| | | | | 433/166 |
| 6,158,493 A * | 12/2000 | Hildebrand | ............ | B44D 3/162 |
| | | | | 15/236.01 |
| 7,314,076 B2 * | 1/2008 | Wardell | ............... | B32B 43/006 |
| | | | | 156/717 |
| 9,027,196 B1 * | 5/2015 | Solak | ............... | E04F 21/165 |
| | | | | 15/245.1 |
| 2014/0216605 A1 | 8/2014 | Batty | | |

FOREIGN PATENT DOCUMENTS

| EP | 0 934 790 A2 | 8/1999 |
|---|---|---|
| EP | 0 953 412 A2 | 11/1999 |

OTHER PUBLICATIONS

Behring-Made Knives web page, http://www.behringmade.com/products/premium-sambar-stag-horse-rasp-camp-knife.*
International Search Report for International Application No. PCT/EP2015/073718 dated Dec. 18, 2015.

* cited by examiner

FLAT FILE

CROSS-REFERENCE TO RELATED APPLICATION

The present patent application/patent claims the benefit of priority of co-pending PCT/EP2015/073718 (WO2016/062588), the content of which are incorporated in full by reference herein.

FIELD OF THE INVENTION

The invention relates to a flat file which is suitable for lifting off films from intermediate layers.

BACKGROUND OF THE INVENTION

As is known, files are multi-fluted cutting tools for abrading materials by the processing method "filing". From wikipedia, keyword "Feile", a wide variety of components of files and the different shapes of files are, known.

"Intermediate layers" within the meaning of the invention, or shims, are products for underlaying in machines for the purpose of tolerance compensation. According to wikipedia, keyword "Zwischenlagen", this means products for underlaying that compensate a fabrication tolerance of mechanical components, and are supposed to simplify the function of adjusting the allowance in the mounting of mechanical components. The use of shims avoids mechanical "after" processing, for example, by repair-lathing the integral mounting flange or subsequent grinding of a spacer disk. There are shims in different designs. According to wikipedia, they are distinguished, in addition to the preparation method and the material employed, also by their possible applications. "Intermediate layers" within the meaning of the present invention include, in particular, bundled shims, in which individual films are interconnected by adhesive bonding on end faces, as is known, for example, from the bonding of book spines or tear-off calendars. Similarly, the intermediate layers include laminated shims in which the individual films are bonded with each other with specialized adhesives on the entire or partial surface area thereof. In this case, the individual films may be made of the same or different materials, especially metal or plastic.

Usually, manual tools, such as knives, are employed for peeling off single or several films. Because of the sharpness of knives and the knife tip, which is usually present, these tools involve a considerable risk potential.

OBJECT OF THE INVENTION

Therefore, it is the object of the present invention to provide a riskless tool for the peeling of films from a shim.

BRIEF DESCRIPTION OF THE DRAWINGS

The present invention is illustrated and described herein with reference to the various drawings, in which.

DETAILED DESCRIPTION OF THE INVENTION

Figure 1:
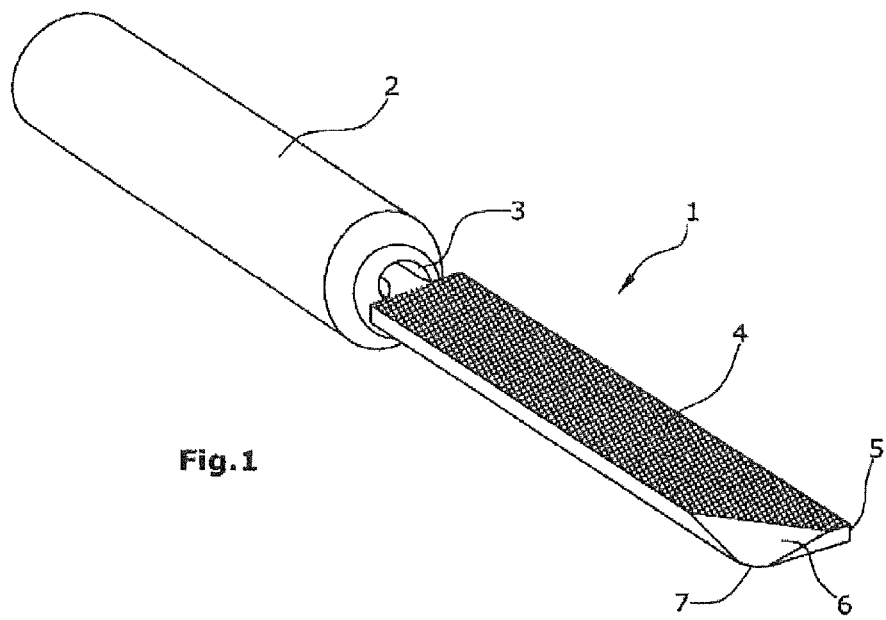
FIG. 1 is a flat file 1 with one cutting bevel 6 according to the invention.

In a first embodiment of the invention, the so-called object is achieved by a flat file 1 with a file handle 2, a file tang 3 and a file blade 4, which is characterized in that said file blade 4 has a single-cut and/or a cross-cut and/or a rasp cut, and proceeding from a first of its tips 5, instead of the second tip, a one-sided or two-sided knife-like cutting bevel 6 with a ricasso 7 in the region of the cutting bevel 6.

With the above mentioned flat file 1, a tool for peeling films from a shim is provided, which has no sharp edges and thus represents a tool without a substantial risk potential for the user.

According to the invention, proceeding from a commercially available flat file 1 with a file handle 2, a file tang 3 and a file blade 4 that has a single-cut and/or a cross-cut and/or a rasp cut, this is modified in such a way that it is processed in the region of one of the two tips 5, for example, by abrading part of the material of the file blade 4, to form a one-sided or two-sided knife-like cutting bevel 6. An essential element of this knife-like cutting bevel 6 resides in the fact that it is not processed into a sharp edge, but that the cutting bevel 6 has a ricasso 7. This ricasso 7, whose sharpness is comparable with that of a commercially available spatula, ensures that, when films of an intermediate layer are lifted off, exactly the desired number of films can be lifted off without exhibiting a risk potential for the user, in contrast to a commercially available file.

FIG. 1 shows a flat file 1 according to the invention. The file blade 4 is stuck in the file handle 2 through the file tang 3. So far, it is a typical flat file of the prior art. FIG. 1 shows the region according to the invention of the file blade 4. One of the two tips 5 has been processed in such a way that a cutting bevel 6 having a ricasso 7 exists.

This can be achieved, for example, by simply processing a commercially available file.

For lifting off films of a shim, the uppermost layer of the laminate portion, for example, a ring of 300×250×2.0 mm is slightly scratched with the cut of file 1 and lifted off very slightly. Subsequently, the flat side of the tip of file 1, i.e., the cutting bevel 6 with the ricasso 7, is used to further lift off the lifted-off film with the spatula-shaped region of cutting bevel 6. This results in a lifted-off film that forms a line on the periphery of the ring, especially in the above mentioned laminate portion, where it is still connected with the ring.

During the further peeling, this line-shaped connection with the ring means an increase of the size of the line and thus increasing forces when the film is peeled off.

Now, it is the further object to reduce the peeling force by using the remaining tip 5. The film is now broken at the site of the line-shaped connection like with a fang. Subsequently, the cutting bevel 6 is again used, the severed film is lifted up below one end thereof, and the film is peeled off along the annular web. The line-shaped connection is now reduced to the 250 mm width of the annular web, and the peeling takes place more simply.

The cutting bevel 6 can be designed in a wide variety of ways.

The simplest way of preparing the cutting bevel 6 is to process the flat file 1 with an abrasive to produce a planar surface. This planar surface extends more or less diagonally from a partially or completely removed file tip. This cutting bevel 6 has a ricasso 7, so that the tool has no sharp corners.

Figure 2:
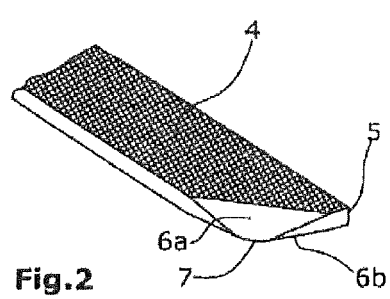
FIG. 2 is a flat file 1 with two cutting bevels 6a and 6b according to the invention.

Alternatively to the one cutting bevel 6 according to FIG. 1, the flat file 1 according to the invention may also have two cutting bevels 6, as shown in FIG. 2. The corresponding cutting bevels 6a, 6b can be cut simply from a commercially available file. It is not necessarily required that the two cutting bevels 6a, 6b are identical. For example, the inclination angle of cutting bevel 6a may have a design different from that of the inclination angle of cutting bevel 6b.

Figure 3:
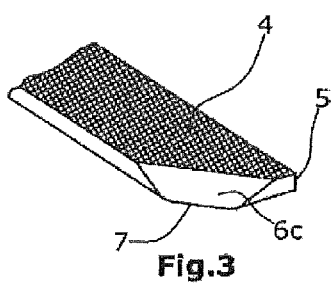
FIG. 3 is a cutting bevel 6c that has two "tips"

FIG. 3 shows another embodiment of the present invention, in which the cutting bevel 6c has two "tips", which are also preferably rounded, in order that a risk potential for the user can be excluded or minimized.

Figure 4:
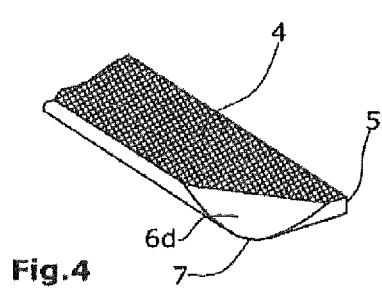
FIG. 4 is a cutting bevel 6d that has a freeform surface.

FIG. 4 shows an embodiment of the file according to the invention, in which the cutting bevel 6d has a freeform surface. Similarly to the above mentioned geometrical surfaces, this freeform surface can be adapted to a particular kind of shims in order to achieve particular simplifications in the lifting off of the shims.

Figure 5:
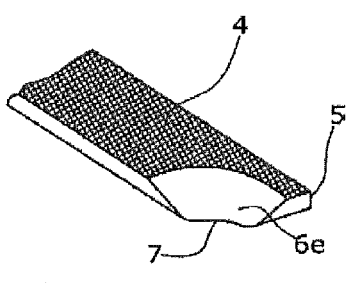
FIG. 5 is a cutting bevel 6e that represents a segment of a frustoconical solid.

FIG. 5 shows another alternative embodiment of the flat file 1 according to the invention, in which the cutting bevel 6e represents a segment of a frustoconical solid.

In this case too, it is reasonable to round existing sharp corners.

The use of the above defined flat file 1 according to the invention is described above for the example of an annular shim.

Accordingly, the use of a corresponding flat file 1 for the peeling of films of a shim is characterized in that a flat file 1 is used for the peeling of films of a shim, wherein
(a) one or more films are slightly scratched with the cut and partially lifted off;
(b) the lifted-off film or films are subsequently lifted further with the cutting bevel 6;
(c) the film or films are subsequently broken with tip 5; and
(d) an end of the film or films is supported by the cutting bevel 6, and the film or films are peeled off.

Although the present invention is illustrated herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following nonlimiting claims.

What is claimed is:

1. A flat file comprising:
   a file handle;
   a file tang;
   a flat file blade extending from a first end to a second end;
   wherein the file tang extends from the first end of the flat file blade;
   wherein the flat file blade comprises an upper surface extending from the first end to the second end, a lower surface extending from the first end to the second end, a first side surface extending from the upper surface to the lower surface, a second side surface extending from the upper surface to the lower surface, and a flat end surface at the second end;
   wherein the flat file blade comprises a cutting bevel having a bevel surface and a ricasso,
   wherein the bevel surface extends from the upper surface toward the lower surface, intersects the first side surface to define an inclined edge and intersects the flat end surface to define an inclined edge; and
   wherein the upper surface has a single-cut, cross-cut or a rasp cut.

2. The flat file according to claim 1, characterized in that said cutting bevel has at least one planar surface.

3. The flat file according to claim 1, characterized in that said cutting bevel has at least one geometrical non-planar surface.

4. The flat file according to claim 1, characterized in that said ricasso is bounded by non-acute, rounded corners in the region of the cutting bevel.

5. A process for peeling of films of a shim using a flat file having a flat file blade comprising an upper surface extending from a first end to a second end, a lower surface extending from the first end to the second end, a first side surface extending from the upper surface to the lower surface, a second side surface extending from the upper surface to the lower surface, and a flat end surface at the second end; wherein the second side surface and the flat end surface intersect to form a tip, further wherein the flat file blade comprises a cutting bevel having a bevel surface and a ricasso, and wherein the bevel surface extends from the upper surface toward the lower surface, intersects the first side surface to define an inclined edge and intersects the flat end surface to define an inclined edge, the process comprising:
   scratching one or more films, composed of metal or plastic, by the flat file causing the one or more films to be partially lifted off;
   subsequently further lifting the lifted-off film or films with the cutting bevel;
   subsequently breaking the lifted-off film or films with the tip;
   subsequently supporting an end of the broken film or films with the cutting bevel;
   and peeling off the broken film or films.

* * * * *

UNITED STATES PATENT AND TRADEMARK OFFICE
CERTIFICATE OF CORRECTION

PATENT NO. : 10,144,075 B2
APPLICATION NO. : 15/516840
DATED : December 4, 2018
INVENTOR(S) : Christoph Martin Page 1 of 1

It is certified that error appears in the above-identified patent and that said Letters Patent is hereby corrected as shown below:

On the Title Page

Column 1, item (30) Foreign Application Priority Data:
Change "Oct. 23, 2014 DE ...................... 20 2014 008 439 U" to
Oct. 23, 2014 DE ...................... 20 2014 008 439.4

Signed and Sealed this
Twenty-ninth Day of January, 2019

Andrei Iancu
*Director of the United States Patent and Trademark Office*